United States Patent
Jiang et al.

(10) Patent No.: US 12,169,942 B2
(45) Date of Patent: Dec. 17, 2024

(54) METHOD FOR TRAINING IMAGE DEPTH ESTIMATION MODEL AND METHOD FOR PROCESSING IMAGE DEPTH INFORMATION

(71) Applicant: BEIJING BAIDU NETCOM SCIENCE TECHNOLOGY CO., LTD., Beijing (CN)

(72) Inventors: Minyue Jiang, Beijing (CN); Xipeng Yang, Beijing (CN); Xiao Tan, Beijing (CN); Hao Sun, Beijing (CN)

(73) Assignee: BEIJING BAIDU NETCOM SCIENCE TECHNOLOGY CO., LTD.

( * ) Notice: Subject to any disclaimer, the term of this patent is extended or adjusted under 35 U.S.C. 154(b) by 580 days.

(21) Appl. No.: 17/324,174

(22) Filed: May 19, 2021

(65) Prior Publication Data
US 2021/0272306 A1    Sep. 2, 2021

(30) Foreign Application Priority Data

Dec. 23, 2020 (CN) .......................... 202011546584.4

(51) Int. Cl.
*G06T 7/00* (2017.01)
*G06T 7/55* (2017.01)
(Continued)

(52) U.S. Cl.
CPC .............. *G06T 7/55* (2017.01); *B60W 60/001* (2020.02); *G01S 13/89* (2013.01); *G01S 13/931* (2013.01);
(Continued)

(58) Field of Classification Search
CPC ... G06T 7/55; G06T 7/13; G06T 2207/10028; G06T 2207/10044; G06T 2207/20081;
(Continued)

(56) References Cited

U.S. PATENT DOCUMENTS

| 10,580,158 | B1 | 3/2020 | Mousavian et al. |
| 2019/0004535 | A1 | 1/2019 | Huang et al. |
| 2022/0024485 | A1* | 1/2022 | Theverapperuma ......... B60W 60/0025 |

FOREIGN PATENT DOCUMENTS

| CN | 109118532 A | 1/2019 |
| CN | 110400337 A | 11/2019 |

(Continued)

OTHER PUBLICATIONS

Xu, Yan et al., Depth Completion from Sparse LiDAR Data with Depth-Normal Constraints, 2019 IEEE/CVF International Conference on Computer Vision (ICCV), Oct. 27, 2019, pp. 2811-2820.

(Continued)

*Primary Examiner* — Tiffany P Ohman
(74) *Attorney, Agent, or Firm* — Dilworth IP, LLC (57) ABSTRACT

A method for training an image depth estimation model. A sample environmental image, sample environmental point cloud data and sample edge information of the sample environmental image are input into a to-be-trained model; initial depth information of each of pixel points in the sample environmental image and a feature relationship between each of the pixel points and a corresponding neighboring pixel point of each of the pixel points are determined through the to-be-trained model, the initial depth information of each of the pixel points is optimized according to the feature relationship to obtain optimized depth information of each of the pixel points, and a parameter of the to-be-trained model is adjusted according to the optimized depth information to obtain the image depth estimation model.

20 Claims, 6 Drawing Sheets

(51) Int. Cl.
*G06T 7/13* (2017.01)
*B60W 60/00* (2020.01)
*G01S 13/89* (2006.01)
*G01S 13/931* (2020.01)
*G06N 3/08* (2023.01)

(52) U.S. Cl.
CPC ............... *G06N 3/08* (2013.01); *G06T 7/13* (2017.01); *B60W 2420/42* (2013.01); *B60W 2420/52* (2013.01); *G06T 2207/10028* (2013.01); *G06T 2207/10044* (2013.01); *G06T 2207/20081* (2013.01); *G06T 2207/30252* (2013.01)

(58) Field of Classification Search
CPC ...... G06T 2207/30252; B60W 60/001; B60W 2420/42; B60W 2420/52; G01S 13/931; G01S 13/89; G06N 3/08
USPC .......................................................... 701/28
See application file for complete search history.

(56) References Cited

FOREIGN PATENT DOCUMENTS

| | | |
|---|---|---|
| CN | 111311666 A | 6/2020 |
| CN | 111428859 A | 7/2020 |
| WO | 2019047656 A1 | 3/2019 |
| WO | 2020233436 A1 | 11/2020 |

OTHER PUBLICATIONS

Park, Jinsun et al., Non-Local Spatial Propagation Network for Depth Completion, arxiv.org, Cornell University Library, Jul. 20, 2020, pp. 1-16.
Guo, Yi et al., Depth Edge Guided CNNs for Sparse Depth Upsampling, arxiv.org, Cornell University Library, Mar. 23, 2020, pp. 1-13.
Zhang, Yinda et al., Deep Depth Completion of a Single RGB-D Image, 2018 IEEE/CVF Conference on Computer Vision and Pattern Recognition, Jun. 18, 2018, pp. 175-185.
European Search Report in EP Patent Application No. 21175934.5 dated Dec. 2, 2021.
First Office Action in CN Patent Application No. 202011546584.4 dated Sep. 27, 2023.

* cited by examiner

METHOD FOR TRAINING IMAGE DEPTH ESTIMATION MODEL AND METHOD FOR PROCESSING IMAGE DEPTH INFORMATION

CROSS-REFERENCE TO RELATED APPLICATIONS

The present application claims priority to Chinese application number 2020115465844, filed on Dec. 23, 2020, which is incorporated by reference in its entirety.

TECHNICAL FIELD

The present application relates to computer and image processing technologies, and in particular, to a method for training an image depth estimation model, a method and apparatus for processing image depth information, an automatic driving vehicle, an electronic device, a program product, a storage medium, which can be applied to artificial intelligence fields such as automatic driving, computer vision, and deep learning, etc.

BACKGROUND

Depth information of an image may be understood as distances from an image collector to each point in a scene corresponding to the image.

In prior art, depth information can be widely used in various fields, such as an automatic driving field, a robotic field, etc. When optimizing the depth information of an environmental image, a general method is: performing complementation for the depth information of the environmental image based on coordinate calculation.

However, the accuracy of the depth information optimized based on the coordinate calculation and other methods may be relatively lower.

SUMMARY

The present application provides a method for training an image depth estimation model, a method and apparatus for processing image depth information, an automatic driving vehicle, an electronic device, a program product, a storage medium, which are used to improve the accuracy of optimized image depth information.

In a first aspect, the present application provides a method for training an image depth estimation model, including:
inputting an acquired sample environmental image, sample environmental point cloud data and sample edge information of the sample environmental image into a to-be-trained model;
determining initial depth information of each of pixel points in the sample environmental image and a feature relationship between each of the pixel points and a corresponding neighboring pixel point of each of the pixel points according to the sample environmental image, the sample environmental point cloud data and the sample edge information of the sample environmental image through the to-be-trained model, and optimizing the initial depth information of each of the pixel points according to the feature relationship to obtain optimized depth information of each of the pixel points, and adjusting a parameter of the to-be-trained model according to the optimized depth information to obtain the image depth estimation model;
where the image depth estimation model is configured to obtain optimized depth information of respective pixel points in the environmental image.

In another aspect, the present application provides a method for processing image depth information, including:
acquiring an environmental image and environmental point cloud data; and inputting the environment image and the environmental point cloud data to an image depth estimation model generated by training based on the method according to the above-mentioned embodiment, and outputting optimized depth information of respective pixel point in the environmental image.

In another aspect, the present application provides an apparatus for training an image depth estimation model, including:
an inputting module, configured to input an acquired sample environmental image, sample environmental point cloud data and sample edge information of the sample environmental image into a to-be-trained model;
a determining module, configured to determine initial depth information of each of pixel points in the sample environmental image and a feature relationship between each of the pixel points and a corresponding neighboring pixel point of each of the pixel points according to the sample environmental image, the sample environmental point cloud data and the sample edge information of the sample environmental image through the to-be-trained model;
an optimizing module, configured to optimize the initial depth information of each of the pixel points according to the feature relationship to obtain optimized depth information of each of the pixel points; and
an adjusting module, configured to adjust a parameter of the to-be-trained model according to the optimized depth information to obtain the image depth estimation model;
where the image depth estimation model is configured to obtain optimized depth information of respective pixel points in the environmental image.

In another aspect, the present application provides an apparatus for processing image depth information, including:
an acquiring module, configured to acquire an environmental image and environmental point cloud data; and
an estimating module, configured to input the environment image and the environmental point cloud data to an image depth estimation model generated by training based on the method according to the above-mentioned embodiment, and output optimized depth information of respective pixel points in the environmental image.

In another aspect, the present application provides an electronic device, including:
at least one processor; and
a memory communicatively connected to the at least one processor;
where the memory is stored with instructions executable by the at least one processor, and the instructions are executed by the at least one processor to enable the at least one processor to execute the method of the above-mentioned embodiment.

In another aspect, the present application provides a non-transitory computer readable storage medium stored with computer instructions, where the computer instructions are configured to enable a computer to execute the method of the above-mentioned embodiment.

In another aspect, the present application provides an automatic driving vehicle, comprising: an image acquiring apparatus, a radar sensor, a controller, and the apparatus for processing image depth information of the above-mentioned embodiment, where the image acquiring apparatus is configured to acquire an environmental image of the automatic driving vehicle;

the radar sensor is configured to collect environmental point cloud data of the automatic driving vehicle;

the apparatus for processing image depth information is configured to output optimized depth information of respective pixel points in the environmental image according to the environmental image and the environmental point cloud data of the automatic driving vehicle; and the controller is configured to perform automatic driving control processing on the automatic driving vehicle according to the optimized depth information of the respective pixel points in the environmental image.

It should be understood that the content described in this section is not intended to point out the key or important features of embodiments of the present application, nor to limit the scope of the present application. Other features of the present application will be easily understood through the following description.

BRIEF DESCRIPTION OF DRAWINGS

The drawings are used for better understanding of the present solution and do not constitute a limitation of the present application.

DESCRIPTION OF EMBODIMENTS

The following describes exemplary embodiments of the present application with reference to the accompanying drawings, which includes various details of the embodiments of the present application to facilitate understanding, and the described embodiments are merely exemplary. Therefore, persons of ordinary skill in the art should know that various changes and modifications can be made to the embodiments described herein without departing from the scope and spirit of the present application. Also, for clarity and conciseness, descriptions of well-known functions and structures are omitted in the following description.

It should be noted that optimizing depth information of an environmental image based on coordinate calculation in related art may cause a problem that the accuracy and reliability of the optimized depth information is relatively lower, that is, there may be a problem that the depth information is not complemented completely, or the complementation is wrong.

Through creative work, the inventor of the present application obtained the inventive concept of embodiments of the present application: combining an environmental image and environmental point cloud data to determine depth information of each of pixel points in the environmental image, and a feature relationship between each of the pixel points and a corresponding neighboring pixel point of each of the pixel points, and optimizing the depth information of each of the pixel points, that is, performing complementation, so as to ensure the accuracy and reliability of the optimized depth information.

Based on the above inventive concept, the present application provides a method for training an image depth estimation model, a method and apparatus for processing image depth information, an automatic driving vehicle, an electronic device, a program product, a storage medium, which can be applied to artificial intelligence fields such as automatic driving, computer vision, and deep learning, etc., so as to achieve a technical effect that the optimization of depth information is accurate and reliable.

Figure 1:
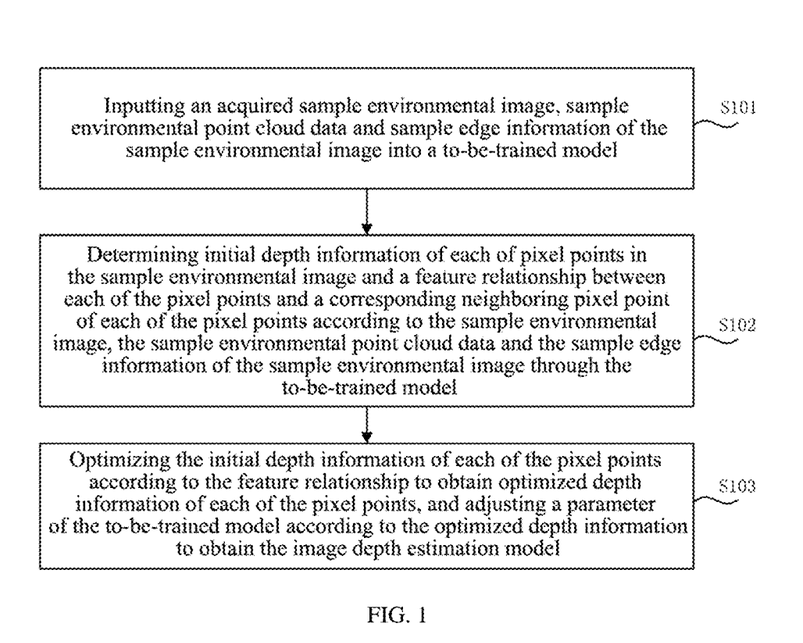
FIG. 1 is a schematic diagram according to a first embodiment of the present application.

FIG. 1 is a schematic diagram according to a first embodiment of the present application, as shown in FIG. 1, a method for training an image depth estimation model of the embodiment includes:

S101: inputting an acquired sample environmental image, sample environmental point cloud data and sample edge information of the sample environmental image into a to-be-trained model.

Exemplarily, an execution subject body of the embodiment may be an apparatus for training an image depth estimation model (hereinafter referred to as a training apparatus), and the training apparatus may be a server (such as a cloud server or a local server, etc.), a computer, a terminal device, a processor, and a chip, etc.

Among them, the to-be-trained model may be a convolutional neural network model, and a parameter of the convolutional neural network model (such as the number of channels, a convolution kernel coefficient, etc.) is not limited in the embodiment.

Among them, the sample environmental image may represent an image of the environment in a scene with optimized depth information. For example, for an application scenario of automatic driving, the environmental image may represent an image including objects in a travelling environment during a travelling process of an automatic driving vehicle.

In the same way, the sample environmental point cloud data may represent point cloud data of objects in the environment in a scene with optimized depth information. For example, for an application scenario of automatic driving, the environmental point cloud data may represent point cloud data of objects in a travelling environment during a travelling process of an automatic driving vehicle.

The sample edge information of the sample environmental image may represent edge information which is obtained by extracting an edge feature of the sample environmental image.

S102: determining initial depth information of each of pixel points in the sample environmental image and a feature relationship between each of the pixel points and a corresponding neighboring pixel point of each of the pixel points according to the sample environmental image, the sample environmental point cloud data and the sample edge information of the sample environmental image through the to-be-trained model.

It should be noted that in this step, content of two dimensions may be determined based on the sample environmental image, the sample edge information of the sample environmental image, and the environmental point cloud data. Content of one dimension is the initial depth information of each of the pixel points in the sample environmental image, and content of the other dimension is the feature relationship between each of the pixel points and a corresponding neighboring pixel point thereof.

Among them, a neighborhood may be 8-neighborhoods, 4-neighborhoods, or 16-neighborhoods, which is not limited in the embodiment. Taking a pixel point a and a neighborhood of 8 as an example, with reference to FIG. 2, the feature relationship between each of pixel points and a corresponding neighboring pixel point thereof is exemplarily described as follows.

Figure 2:
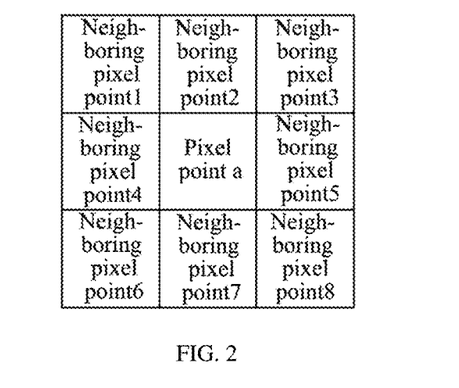
FIG. 2 is a schematic diagram of an eight neighborhoods according to the present application.

As shown in FIG. 2, the pixel point a is a center point, and 8 points whose pixel point distance to the pixel point a are closest are the neighboring pixel points, such as a neighboring pixel point 1 to a neighboring pixel point 8 as shown in FIG. 2.

It should be noted that FIG. 2 is only used to exemplarily illustrate a positional relationship between each of pixel points and neighboring pixel point in the embodiment, and it cannot be understood as a limitation of the positional relationship between each of the pixel points and the neighboring pixel point.

Each of the pixel points owns corresponding features, such as a color feature (such as an RGB value, etc.), a texture feature, and a shape feature. In the embodiment, an associate relationship between the feature of the center point a and the feature of each neighboring pixel point of the 8 neighboring pixel points may be determined, such as an associate relationship between color features, an associate relationship between texture features, and an associate relationship between shape features, etc.

S103: optimizing the initial depth information of each of the pixel points according to the feature relationship to obtain optimized depth information of each of the pixel points, and adjusting a parameter of the to-be-trained model according to the optimized depth information to obtain the image depth estimation model.

Among them, the image depth estimation model is used to obtain optimized depth information of respective pixel points in the environmental image.

It should be noted that, in the embodiment, a feature of the feature relationship is introduced, and the initial depth information of each of the pixel points is optimized according to the feature relationship, the optimized depth information of each of the pixel points is thus obtained.

For example, combining with the above example and FIG. 2, the feature relationship may be an associate relationship between the feature of the pixel point a and the feature of each of pixel points of the neighboring pixel points 1 to 8, where optimization of the depth information of the pixel point a based on the associate relationship is equivalent to adjustment (such as correction) and/or complementation of the depth information of the pixel point a based on the neighboring pixel points, so that the depth information of the pixel point a matches with relevant information of an actual object as much as possible. Therefore, the technical effect of improving accuracy and reliability of the optimized depth information can be achieved.

Figure 3:
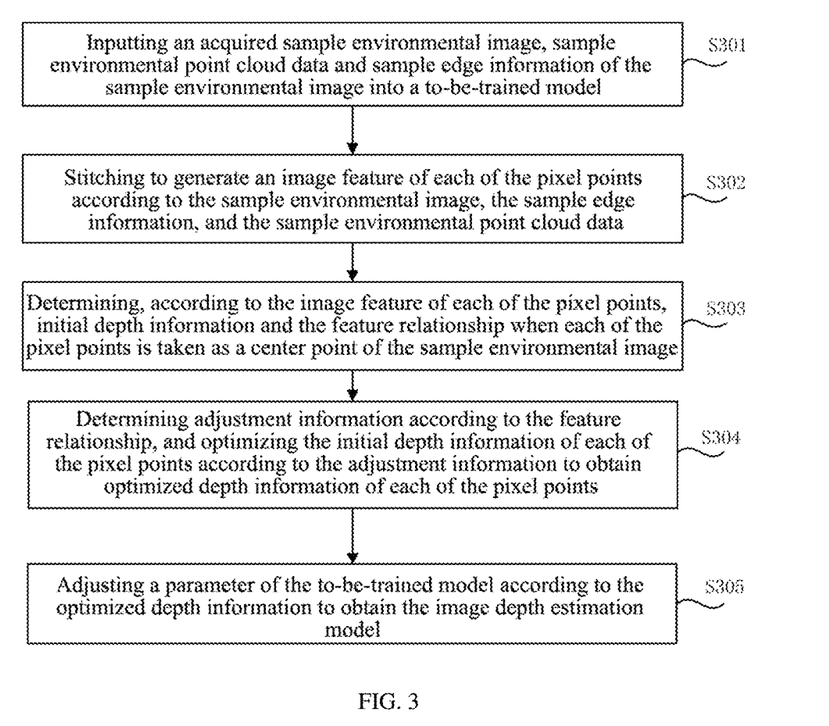
FIG. 3 is a schematic diagram according to a second embodiment of the present application.

FIG. 3 is a schematic diagram according to a second embodiment of the present application, as shown in FIG. 3, a method for training an image depth estimation model of the embodiment includes:

S301: inputting an acquired sample environmental image, sample environmental point cloud data and sample edge information of the sample environmental image into a to-be-trained model.

Exemplarily, for the description of S301, reference may be made to S101, which will not be repeated herein.

S302: stitching to generate an image feature of each of the pixel points according to the sample environmental image, the sample edge information, and the sample environmental point cloud data.

Exemplarily, the image feature may represent a color feature, a texture feature, a shape feature, and a spatial relationship feature of each of the pixel points.

S303: determining, according to the image feature of each of the pixel points, initial depth information and the feature relationship when each of the pixel points is taken as a center point of the sample environmental image.

In the embodiment, for any pixel point, the initial depth information and the feature relationship of the pixel point are determined when the pixel point is taken as the center point of the environmental image.

In the embodiment, the image feature of each of the pixel points is obtained by stitching the environmental image and the environmental point cloud data, so that the image feature of each of the pixel points includes both of the image feature corresponding to the environmental image and the image feature corresponding to the environmental point cloud data, thus making the image feature of each of the pixel points much richer, thereby achieving the technical effect of improving the comprehensiveness and reliability of the determined depth information and the feature relationship.

S304: determining adjustment information according to the feature relationship, and optimizing the initial depth information of each of the pixel points according to the adjustment information to obtain optimized depth information of each of the pixel points.

Combining the above examples, it can be seen that the feature relationship may represent the association relationship between the feature of each of the pixel points and the feature of the neighboring pixel point. In the embodiment, by determining the adjustment information according to the feature relationship, the accuracy and reliability of the adjustment information can be improved, so that when the initial depth information of each of the pixel points is optimized based on the adjustment information, the technical effect of improving the accuracy and reliability of the optimized depth information of each of the pixel points can be achieved.

In some embodiments, the feature relationship includes at least one of a similarity degree between each of the pixel points and the neighboring pixel point, a belonging object relationship between each of the pixel points and the neighboring pixel point, and a confidence of the initial depth information of each of the pixel points; and the determining adjustment information according to the feature relationship includes: determining the adjustment information according to at least one of the similarity degree, the belonging object relationship, and the confidence.

For example, combining the above example with FIG. 2.

The similarity degree may be the similarity degree between the pixel point a and each of the neighboring pixel points 1 to 8, specifically may be, for example, a similarity degree between the feature of the pixel point a and the feature of the pixel point 1, and more specifically may be a similarity degree of the RGB values therebetween.

The belonging object relationship may be whether the pixel point a and each of the neighboring pixel points 1 to 8 belong to the same object. For example, if the pixel point a and the neighboring pixel point 1 both belong to pixel points of a sign, the pixel point a and the neighboring pixel point 1 belong to the same object.

The confidence may be a possibility that the initial depth information of the pixel point a is accurate depth information.

It should be noted that in the embodiment, the feature relationship can include content of one dimension or multiple dimensions, so that the technical effect of the diversity and flexibility of determination of the adjustment information based on the feature relationship can be achieved.

In some embodiments, if the feature relationship includes the similarity degree; the determining the feature relationship according to the image feature of each of the pixel points includes: determining the similarity degree according to the image feature of each of the pixel points and an image feature of the neighboring pixel point.

Exemplarily, the similarity degree is obtained by performing similarity calculation based on the image feature of each of the pixel points and the image feature of the neighboring pixel point, such as a calculation for a similarity between RGB values.

It should be noted that, in the embodiment, by determining the similarity degree based on the image feature, the convenience and quickness of determination of the similarity degree can be improved, thereby improving the efficiency of determination of the optimized depth information.

In some embodiments, if the feature relationship includes the belonging object relationship; the determining the feature relationship according to the image feature of each of the pixel points includes: determining an object to which each of the pixel points belongs and an object to which the neighboring pixel point belongs respectively according to the image feature of each of the pixel points, and determining the belonging object relationship based on the object to which each of the pixel points belongs and the object to which the neighboring pixel point belongs.

Exemplarily, combining the above examples and FIG. 2, an object to which the pixel point a belongs is determined according to the image feature of the pixel point a, and an object to which each neighboring pixel point of the neighboring pixel points 1 to 8 belongs is determined according to the image feature of each neighboring pixel point of the neighboring pixel points 1 to 8, and then a relationship between the object to which the pixel point a belongs and the object to which each neighboring pixel point of the neighboring pixel point 1 to 8 belongs is determined (such as belonging to the same object or belonging to different objects).

It should be noted that in the embodiment, for the image feature of each of the pixel points and the image feature of the corresponding neighboring pixel point, the objects to which they belong (belonging object) are determined respectively, and the belonging object relationship is determined based on the objects, thereby the technical effect of improving the accuracy and reliability of the determined belonging object can be achieved.

In some embodiments, the determining an object to which each of the pixel points belongs and an object to which the neighboring pixel point belongs respectively according to the image feature of each of the pixel points, and determining the belonging object relationship based on the object to which each of the pixel points belongs and the object to which the neighboring pixel point belongs, includes the following steps:

Step 1: determining edge information of the neighboring pixel point according to the image characteristics of the neighboring pixel points, and determining the object to which the neighboring pixel point belongs based on the edge information of the neighboring pixel point; and Step 2: determining edge information of each of the pixel points according to the image feature of each of the pixel points, and determining the object to which each of the pixel points belongs according to the edge information of each of the pixel points.

Exemplarily, the edge information is used to represent information related to an edge of the image, that is, information about an image of an area where one image is connected to another image.

Step 3: determining whether the neighboring pixel point and each of the pixel points belong to the same object or belong to different objects, according to the object to which the neighboring pixel point belongs and the object to which each of the pixel points belongs.

It should be noted that, in the embodiment, by determining the edge information to determine the belonging object, the technical effect that the determined belonging object can have high accuracy and reliability is achieved, thereby the technical effect of the accuracy and reliability of the determination of the neighboring pixel point and each of the pixel points belonging to the same object or different objects can be achieved.

In some embodiments, if the feature relationship includes confidence, and the image feature of at least part of pixel points includes depth information; the determining the feature relationship according to the image feature of each of the pixel points includes the following steps:

Step 1: determining depth information of each of the pixel points according to the depth information of the at least part of the pixel points.

For example, combining the above example and FIG. 2, the image features of at least part of the neighboring pixel points 1 to 8 include depth information, if the image features of the neighboring pixel points 1 to 8 all include depth information, then the depth information of the pixel point a may be determined according to the depth information of the neighboring pixel points 1 to 8.

Step 2: determining the confidence according to the depth information of each of the pixel points determined based on the depth information of the at least part of the pixel points, and the initial depth information of each of the pixel points determined based on the image feature of each of the pixel points.

Correspondingly, the depth information of the pixel point a is determined according to the depth information of the neighboring pixel points 1 to 8, and the initial depth information of the pixel point a is determined based on the image feature of the pixel point a, thus the confidence of the depth information of the pixel point a can be obtained.

It should be noted that, in the embodiment, the depth information of each of pixel points is determined based on the depth information of at least part of the neighboring pixel points, and the confidence is determined by combining the determined depth information and the initial depth information, so that the confidence can have a characteristic of strongly representing the reliability of the depth information, thereby the technical effect of improving the accuracy and reliability of the confidence can be achieved.

S305: adjusting a parameter of the to-be-trained model according to the optimized depth information to obtain the image depth estimation model.

In some embodiments, S305 may include the following steps:

Step 1: determining loss information between the optimized depth information and preset reference depth information.

Exemplarily, the reference depth information may be first-order difference information of the reference depth information. The optimized depth information and the reference depth information may be calculated based on a preset loss function to obtain the corresponding loss information.

Step 2: adjusting the parameter of the to-be-trained model based on the loss information to obtain the image depth estimation model.

Exemplarily, an adjustment range of the parameter of the to-be-trained model may be determined based on the magnitude of the loss information.

Figure 4:
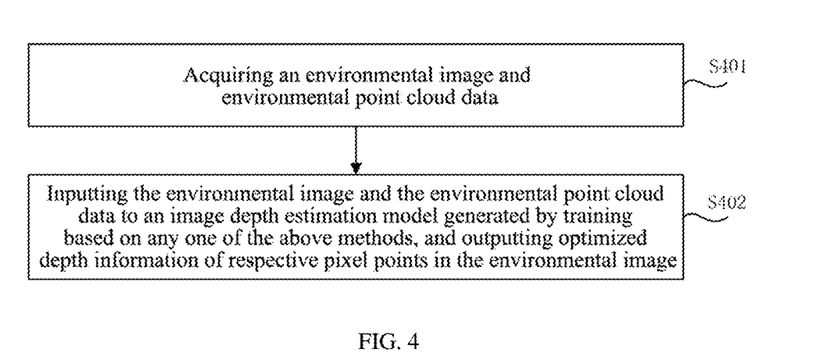
FIG. 4 is a schematic diagram according to a third embodiment of the present application.

FIG. 4 is a schematic diagram according to an third embodiment of the present application, as shown in FIG. 4, a method for processing image depth information of the embodiment includes:

S401: acquiring an environmental image and environmental point cloud data.

Exemplarily, an execution subject body of the embodiment may be an apparatus for processing image depth information (hereinafter referred to as a processing apparatus), and the processing apparatus may be a server (such as a cloud server or a local server, etc.), a computer, a terminal device, a processor, and a chip, etc.

The processing apparatus in the embodiment may be the same apparatus as the training apparatus, or it may be a different apparatus, which is not limited in the embodiment.

Figure 5:
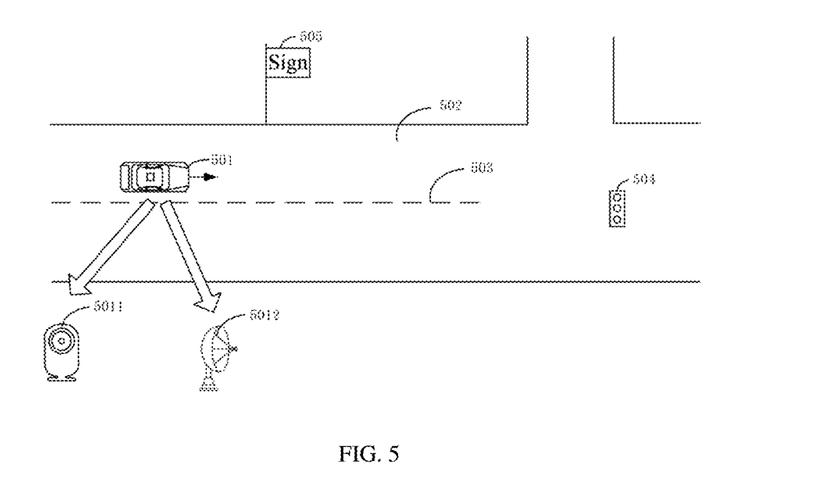
FIG. 5 is a schematic diagram of an application scenario that can implement an embodiment of the present application.

The method of the embodiment can be applied to an application scenario shown in FIG. 5. In the application scenario shown in FIG. 5, an automatic driving vehicle 501 is travelling on the road 502, and the automatic driving vehicle 501 may be equipped with a camera 5011 and a radar sensor 5012.

Among them, the camera 5011 may collect objects within the angle of view of the camera. For example, the camera may collect an environmental image including a lane line 503, a traffic light 504, and a sign 505 as shown in FIG. 5.

The radar sensor 5012 may collect environmental point cloud data corresponding to a radar sensor parameter, such as the environmental point cloud data corresponding to the lane line 503, the traffic light 504, and the sign 505.

It should be noted that the above example is only used to exemplarily illustrate the applicable application scenarios of the embodiment, and cannot be understood as a limitation on the application scenarios of the embodiment.

Correspondingly, combining with the application scenario shown in FIG. 1, the environmental image may be an image including a lane line, a traffic light, and a sign.

Similarly, combining with the application scenario shown in FIG. 1, the environmental point cloud data may be point cloud data including point cloud data of the lane line, the traffic light, and the sign.

And when the method of the embodiment is applied to the application scenario shown in FIG. 5, the processing apparatus may be an automatic driving vehicle, and specifically may be a computer, an in-vehicle terminal, a processor, a chip (such as a chip of Internet of Vehicles) or the like set in the automatic driving vehicle.

With reference to the application scenario shown in FIG. 1, the description of how the processing apparatus obtains the environmental image and the environmental point cloud data is as follows:

the processing apparatus may be connected to the camera and the radar sensor respectively, the camera may send the collected environmental image to the processing apparatus, and the processing apparatus may acquire the environmental image sent by the camera correspondingly; in the same way, the radar sensor may send the collected environmental point cloud data to the processing apparatus, and the processing apparatus may acquire the environmental point cloud data sent by the radar sensor correspondingly.

S402: inputting the environmental image and the environmental point cloud data to an image depth estimation model generated by training based on any one of the above methods, and outputting optimized depth information of respective pixel points in the environmental image.

It should be noted that, for the method for determining the optimized depth information of each of pixel points in the environmental image based on the image depth estimation model, reference can be made to the principle of the method for determining the optimized depth information of each of the pixel points in the environmental image during the training of the image depth estimation model in the above examples, which will not be repeated herein.

Figure 6:
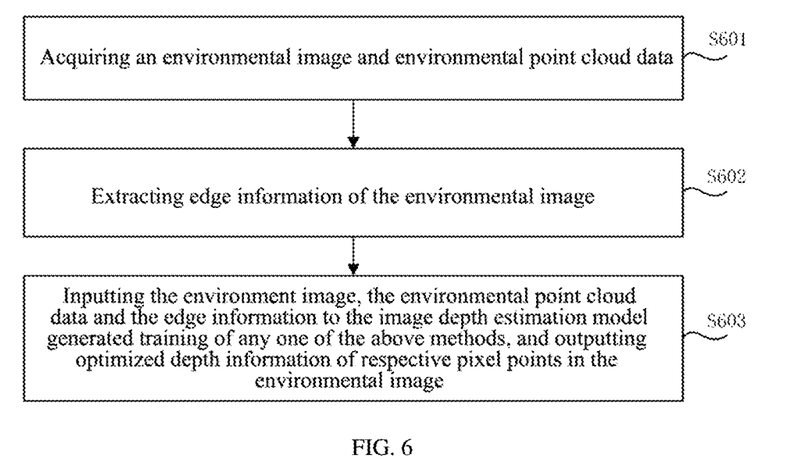
FIG. 6 is a schematic diagram according to a fourth embodiment of the present application.

FIG. 6 is a schematic diagram according to an fourth embodiment of the present application, as shown in FIG. 6, a method for processing image depth information of the embodiment includes:

S601: acquiring an environmental image and environmental point cloud data.

Exemplarily, the description of S601 may refer to S401, which will not be repeated herein.

S602: extracting edge information of the environmental image.

In the embodiment, after acquiring the environmental image, the processing apparatus may extract edge information of the environmental image.

For example, the edge information of the environmental image may be extracted based on a canny operator.

S603: inputting the environment image, the environmental point cloud data and the edge information to the image depth estimation model generated training based on any one of the above methods, and outputting optimized depth information of respective pixel points in the environmental image.

Exemplarily, the description of S603 may refer to the principle of S602, which will not be repeated herein.

Figure 7:
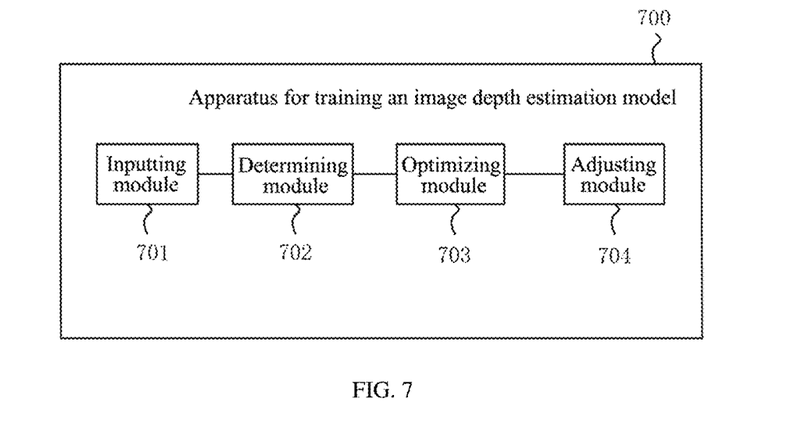
FIG. 7 is a schematic diagram according to a fifth embodiment of the present application.

FIG. 7 is a schematic diagram according to a fifth embodiment of the present application, as shown in FIG. 7, an apparatus for training an image depth estimation model 700 of the embodiment includes:

an inputting module 701, configured to input an acquired sample environmental image, sample environmental point cloud data and sample edge information of the sample environmental image into a to-be-trained model;

a determining module 702, configured to determine initial depth information of each of pixel points in the sample environmental image and a feature relationship between each of the pixel points and a corresponding neighboring pixel point of each of the pixel points according to the sample environmental image, the sample environmental point cloud data and the sample edge information of the sample environmental image through the to-be-trained model;

an optimizing module 703, configured to optimize the initial depth information of each of the pixel points according to the feature relationship to obtain optimized depth information of each of the pixel points; and an adjusting module 704, configured to adjust a parameter of the to-be-trained model according to the optimized depth information to obtain the image depth estimation model;

where the image depth estimation model is configured to obtain optimized depth information of respective pixel points in the environmental image.

Figure 8:
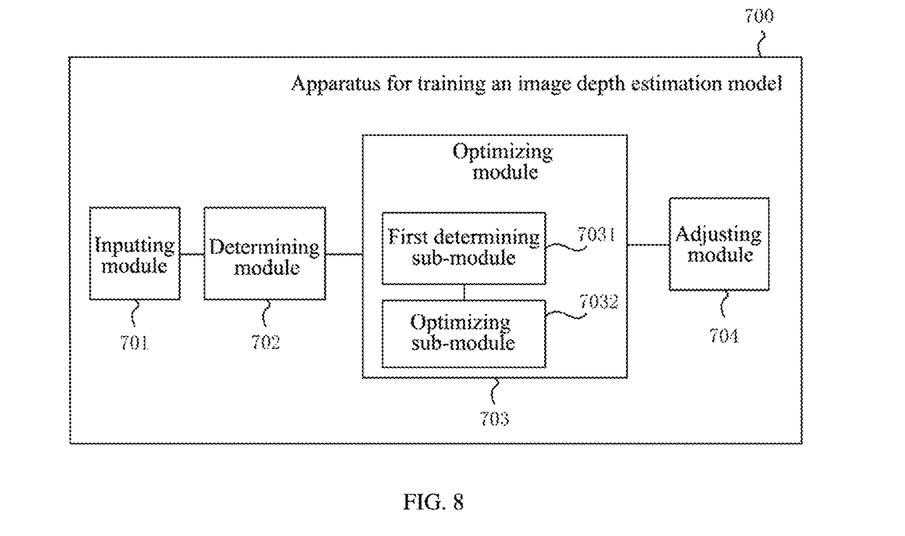
FIG. 8 is a schematic diagram according to a sixth embodiment of the present application.

With reference to FIG. 8, in some embodiments, the second optimizing module 703 includes:

a first determining sub-module 7031, configured to determine adjustment information according to the feature relationship; and an optimizing sub-module 7032, configured to optimize the initial depth information of each of the pixel points according to the adjustment information to obtain the optimized depth information of each of the pixel points.

In some embodiments, the feature relationship includes at least one of a similarity degree between each of the pixel points and the neighboring pixel point, a belonging object relationship between each of the pixel points and the neighboring pixel point, and a confidence of the initial depth information of each of the pixel points; the first determining sub-module 7031 is configured to determine the adjustment information according to at least one of the similarity degree, the belonging object relationship, and the confidence.

Figure 9:
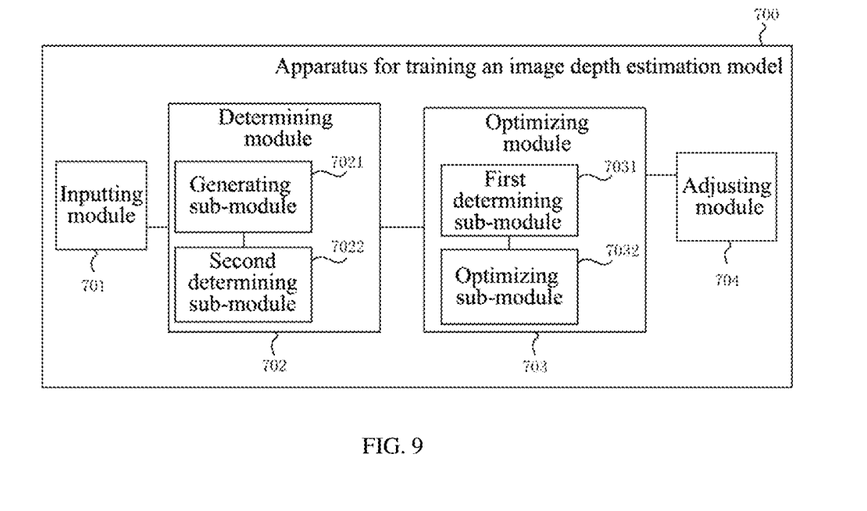
FIG. 9 is a schematic diagram according to a seventh embodiment of the present application.

With reference to FIG. 9, in some embodiments, the determining module 702 includes:

a generating sub-module 7021, configured to stitch to generate an image feature of each of the pixel points according to the sample environmental image, the sample edge information, and the sample environmental point cloud data; and a second determining sub-module 7022, configured to determine, according to the image feature of each of the pixel points, the initial depth information and the feature relationship when each of the pixel points is taken as a center point of the sample environmental image.

In some embodiments, the second determining sub-module 7022 is configured to determine the similarity degree according to the image feature of each of the pixel points and an image feature of the neighboring pixel point.

In some embodiments, the second determining sub-module 7022 is configured to determine an object to which each of the pixel points belongs and an object to which the neighboring pixel point belongs respectively according to the image feature of each of the pixel points, and determine the belonging object relationship based on the object to which each of the pixel points belongs and the object to which the neighboring pixel point belongs.

In some embodiments, the second determining sub-module 7022 is configured to determine edge information of the neighboring pixel point according to the image feature of the neighboring pixel point, and determine the object to which the neighboring pixel point belongs based on the edge information of the neighboring pixel point, determine edge information of each of the pixel points according to the image feature of each of the pixel points, and determine the object to which each of the pixel points belongs according to the edge information of each of the pixel points; and determine whether the neighboring pixel point and each of the pixel points belong to the same object or belong to different objects according to the object to which the neighboring pixel point belongs and the object to which each of the pixel points belongs.

Figure 10:
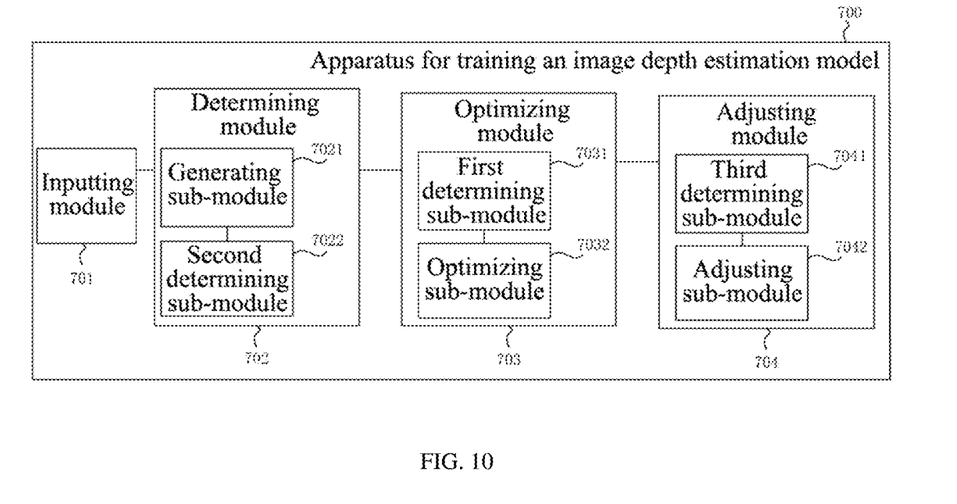
FIG. 10 is a schematic diagram according to an eighth embodiment of the present application.

In some embodiments, if the feature relationship includes the confidence, and the image feature of at least part of pixel points includes depth information; the second determining sub-module 7022 is configured to determine depth information of each of the pixel points according to the depth information of the at least part of the pixel points; and determine the confidence according to the depth information of each of the pixel points determined based on the depth information of the at least part of the pixel points, and the initial depth information of each of the pixel points determined based on the image feature of each of the pixel points With reference to FIG. 10, in some embodiments, the adjusting module 704 includes:

a third determining sub-module 7041, configured to determine loss information between the optimized depth information and preset reference depth information; and an adjusting sub-module 7042, configured to adjust the parameter of the to-be-trained model based on the loss information to obtain the image depth estimation model.

Figure 11:
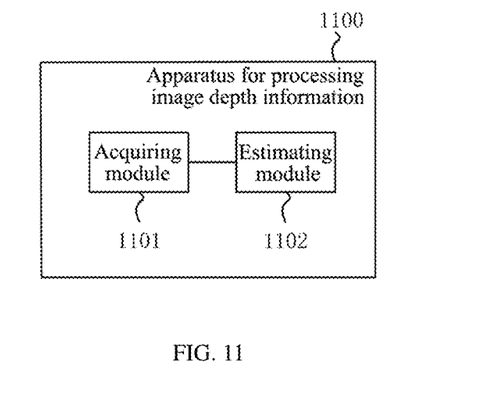
FIG. 11 is a schematic diagram according to a ninth embodiment of the present application.

FIG. 11 is a schematic diagram according to a ninth embodiment of the present application, as shown in FIG. 11, an apparatus for processing image depth information 1100 of the embodiment includes:

an acquiring module 1101, configured to acquire an environmental image and environmental point cloud data; and an estimating module 1102, configured to input the environment image and the environmental point cloud data to an image depth estimation model generated by training based on the method according to any one of the above embodiments, and output optimized depth information of respective pixel points in the environmental image.

Figure 12:
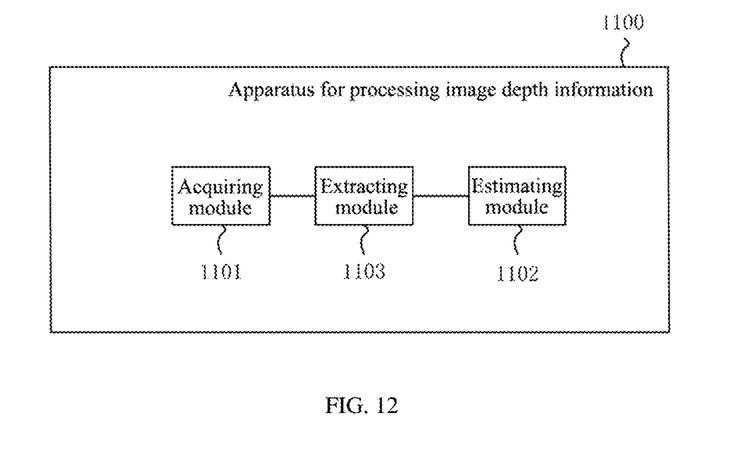
FIG. 12 is a schematic diagram according to a tenth embodiment of the present application.

With reference to FIG. 12, in some embodiments, the apparatus for processing image depth information 1100 further includes:

an extracting module 1103, configured to extract edge information of the environmental image; and the estimating module 1102 is configured to input the environment image, the environmental point cloud data and the edge information to the image depth estimation model generated by training based on the method according to any one of the above embodiments, and output optimized the depth information of the respective pixel points in the environmental image.

According to an embodiment of the present application, the present application further provides an electronic device and a readable storage medium.

According to an embodiment of the present application, the present application further provides a computer program product including a computer program, the computer program is stored in a readable storage medium, at least one processor of an electronic device can read the computer program from the readable storage medium, and the at least one processor executes the computer program to enable the electronic device to execute the solution provided by any one of the above embodiments.

Figure 13:
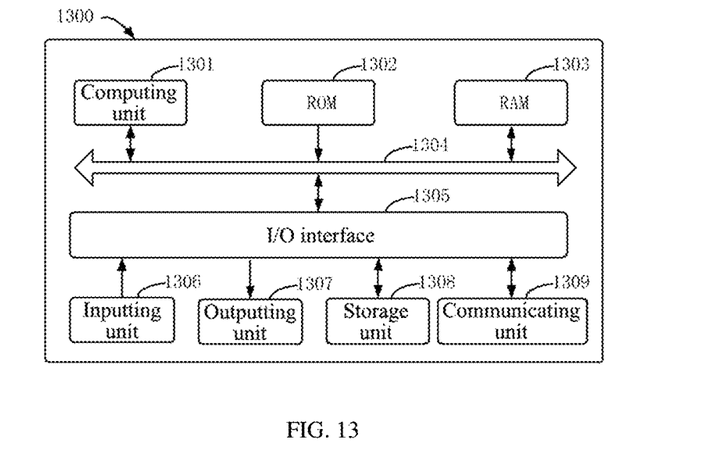
FIG. 13 is a schematic diagram according to an eleventh embodiment of the present application.

FIG. 13 is a block diagram of an electronic device 1300 used to implement an embodiment of the present application. The electronic device is intended to represent various forms of digital computers, such as a laptop computer, a desktop computer, a workbench, a personal digital assistant, a server, a blade server, a mainframe computer, and other suitable computers. The electronic device can also represent various forms of mobile apparatus, such as a personal digital processing, a cellular phone, a smart phone, a wearable device, and other similar computing apparatus. The components, their connections and relationships, and their functions herein are merely examples, and are not intended to limit an implementation of the application described and/or claimed herein.

As shown in FIG. 13, the electronic device 1300 includes a computing unit 1301, which may perform various appropriate actions and processes according to a computer program stored in a read-only memory (ROM) 1302 or a computer program loaded from a storage unit 1308 into a random access memory (RAM) 1303. In the RAM 1303, various programs and data required for the operation of the electronic device 1300 may also be stored. The computing unit 1301, the ROM 1302, and the RAM 1303 are connected to each other through a bus 1304. An input/output (I/O) interface 1305 is also connected to the bus 1304.

Multiple components in the device 1300 are connected to the I/O interface 1305, including: an inputting unit 1306, such as a keyboard, a mouse, etc.; an outputting unit 1307, such as various types of displays, speakers, etc.; and a storage unit 1308, such as a magnetic disk, an optical disk, etc.; and a communicating unit 1309, such as an network card, a modem, a wireless communication transceiver, etc. The communicating unit 1309 allows the device 1300 to exchange information/data with other devices through a computer network such as the Internet and/or various telecommunication networks.

The computing unit 1301 may be various general and/or special-purpose processing components with processing and computing capabilities. Some examples of the computing unit 1301 include, but are not limited to, a central processing unit (CPU), a graphics processing unit (GPU), various dedicated artificial intelligence (AI) computing chips, various computing units that run machine learning model algorithms, and digital signal processing (DSP), as well as any appropriate processor, a controller, a microcontroller, etc. The computing unit 1301 executes the various methods and processes described above, such as the method for training an image depth estimation model and/or the method for processing image depth information. For example, in some embodiments, the method for training an image depth estimation model and/or the method for processing image depth information be implemented as a computer software program, which is tangibly contained in a machine-readable medium, such as the storage unit 1308. In some embodiments, part or all of the computer program may be loaded and/or installed on the device 1300 via the ROM 1302 and/or the communicating unit 1309. When the computer program is loaded into the RAM 1303 and executed by the computing unit 1301, one or more steps of the method for training an image depth estimation model and/or the method for processing image depth information described above may be executed. Alternatively, in other embodiments, the computing unit 1301 may be configured to execute the method for training an image depth estimation model and/or the method for processing image depth information through any other suitable means (for example, by a firmware).

The various implementations of the systems and technologies described above in this article can be implemented in a digital electronic circuit system, an integrated circuit system, a field programmable gate array (FPGA), an application-specific integrated circuit (ASIC), an application-specific standard product (ASSP), a system on chip system (SOC), a complex programming logic device (CPLD), a computer hardware, a firmware, a software, and/or a combination thereof. These various embodiments may include: being implemented in one or more computer programs, the one or more computer programs may be executed and/or interpreted on a programmable system including at least one programmable processor, the programmable processor may be a dedicated or general-purpose programmable processor that can receive data and instructions from a storage system, at least one input device, and at least one output device, and transmit data and instructions to the storage system, the at least one input device, and the at least one output device.

The program code used to implement the method of the present disclosure can be written in any combination of one or more programming languages. The program code can be provided to a processor or a controller of a general-purpose computer, a special-purpose computer, or other programmable data processing apparatus, so that when the program code is executed by the processor or the controller, functions specified in the flowcharts and/or block diagrams are implemented. The program code may be executed entirely on a machine, partly executed on the machine, partly executed on the machine and partly executed on a remote machine as an independent software package, or entirely executed on a remote machine or a server.

In the context of the present disclosure, a machine-readable medium may be a tangible medium, which may contain or store a program for use by an instruction execution system, apparatus, or device or in combination with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or a semiconductor system, apparatus, or device, or any suitable combination of the foregoing. More specific examples of the machine-readable storage media would include electrical connections based on one or more wires, a portable computer disk, a hard disk, a random access memory (RAM), a read-only memory (ROM), a erasable programmable read-only memory (EPROM or flash memory), an optical fiber, a portable compact disk read-only memory (CD-ROM), an optical storage device, a magnetic storage device, or any suitable combination of the foregoing.

In order to provide interaction with users, the systems and techniques described herein may be implemented on a computer, where the computer has: a display apparatus (for example, a CRT (cathode ray tube) or an LCD (liquid crystal display) monitor) for displaying information to users; and a keyboard and a pointing apparatus (for example, a mouse or a trackball) though which users may provide input to the computer. Other types of apparatus may also be used to provide interaction with users; for example, the feedback provided to users may be any form of sensing feedback (for example, visual feedback, audible feedback, or tactile feedback); and the input from users may be received in any form (including sound input, voice input, or tactile input).

The systems and techniques described herein may be implemented in a computing system that includes a back end component (for example, a data server), or a computing system that includes a middleware component (for example, an application server), or a computing system that includes a front end component (for example, a user computer with a graphical user interface or a web browser, through which the user can interact with the implementations of the systems and techniques described herein), or a computing system that includes any combination of such back end component, middleware component, or front end component. System components may be connected to each other by any form or medium of digital data communication (for example, a communication network). Examples of the communication network include: a local area network (LAN), a wide area network (WAN), Internet, and a blockchain network.

A computer system may include a client and a server. The client and the server are generally far from each other and usually perform interactions through a communication network. A relationship between the client and the server is generated by a computer program running on corresponding computers and having a client-server relationship. The server may be a cloud server, also known as a cloud computing server or a cloud host, which is a host product in the cloud computing service system to solve the disadvantages of difficult management and weak business scalability in a traditional physical host and Virtual Private Server service (VPS for short). The server may also be a server of a distributed system, or a server combined with a blockchain.

According to another aspect of embodiments of the present application, an embodiment of the present application further provide an automatic driving vehicle, including: an image acquiring apparatus, a radar sensor, a controller, and the apparatus for processing image depth information described in any of the foregoing embodiments; where, the image acquiring apparatus is configured to acquire an environmental image of the automatic driving vehicle.

Exemplarily, the image acquiring apparatus includes a camera and other devices that can be used to capture images.

The radar sensor is configured to collect environmental point cloud data of the automatic driving vehicle.

The apparatus for processing image depth information is configured to output optimized depth information of respective pixel points in the environmental image according to the environmental image and the environmental point cloud data of the automatic driving vehicle.

The controller is configured to perform automatic driving control processing on the automatic driving vehicle according to the optimized depth information of the respective pixel points in the environmental image.

It should be understood that various forms of processes shown above can be used, and steps may be reordered, added, or deleted. For example, the steps described in the present application may be performed in parallel or sequentially or in different orders. As long as desired results of the technical solutions disclosed in the present application can be achieved, no limitation is made herein.

The above specific embodiments do not constitute a limitation to the protection scope of the present application. Persons skilled in the art should know that various modifications, combinations, sub-combinations and substitutions can be made according to design requirements and other factors. Any modification, equivalent replacement and improvement made within the spirit and principle of the present application shall be included in the protection scope of the present application.

What is claimed is:

1. A method for training an image depth estimation model, comprising:
    inputting a sample environmental image, sample environmental point cloud data and sample edge information of the sample environmental image into a to-be-trained model; and
    determining initial depth information of each of pixel points in the sample environmental and a feature relationship between each of the pixel points and a corresponding neighboring pixel point of each of the pixel points according to the sample environmental image, the sample environmental point cloud data and the sample edge information of the sample environmental image through the to-be-trained model, and optimizing the initial depth information of each of the pixel points according to the feature relationship to obtain optimized depth information of each of the pixel points, and adjusting a parameter of the to-be-trained model according to the optimized depth information to obtain the image depth estimation model;
    wherein the to-be-trained model is a neural network model, and the image depth estimation model is configured to obtain first optimized depth information of respective pixel points in an environmental image.

2. The method according to claim 1, wherein the optimizing the initial depth information of each of the pixel points according to the feature relationship to obtain optimized depth information of each of the pixel points comprises:
    determining adjustment information according to the feature relationship, and optimizing the initial depth information of each of the pixel points according to the adjustment information to obtain the optimized depth information of each of the pixel points.

3. The method according to claim 2, wherein the feature relationship comprises at least one of a similarity degree between each of the pixel points and the neighboring pixel point, a belonging object relationship between each of the pixel points and the neighboring pixel point, and a confidence of the initial depth information of each of the pixel points;
    the determining adjustment information according to the feature relationship comprises:
    determining the adjustment information according to at least one of the similarity degree, the belonging object relationship, and the confidence.

4. The method according to claim 3, wherein determining initial depth information of each of the pixel points in the sample environmental image and a feature relationship between each of the pixel points and a corresponding neighboring pixel point of each of the pixel points according to the sample environmental image, the sample environmental point cloud data and the sample edge information of the sample environmental image comprises:
    stitching to generate an image feature of each of the pixel points according to the sample environmental image, the sample edge information, and the sample environmental point cloud data; and
    determining, according to the image feature of each of the pixel points, the initial depth information and the feature relationship when each of the pixel points is taken as a center point of the sample environmental image.

5. The method according to claim 4, wherein if the feature relationship comprises the similarity degree;
    the determining the feature relationship according to the image feature of each of the pixel points comprises:

determining the similarity degree according to the image feature of each of the pixel points and an image feature of the neighboring pixel point.

6. The method according to claim 4, wherein if the feature relationship comprises the belonging object relationship;
the determining the feature relationship according to the image feature of each of the pixel points comprises:
determining an object to which each of the pixel points belongs and an object to which the neighboring pixel point belongs respectively according to the image feature of each of the pixel points, and determining the belonging object relationship based on the object to which each of the pixel points belongs and the object to which the neighboring pixel point belongs.

7. The method according to claim 6, wherein the determining an object to which each of the pixel points belongs and an object to which the neighboring pixel point belongs respectively according to the image feature of each of the pixel point comprises:
determining edge information of the neighboring pixel point according to the image feature of the neighboring pixel point, and determining the object to which the neighboring pixel point belongs based on the edge information of the neighboring pixel point; and
determining edge information of each of the pixel points according to the image feature of each of the pixel points, and determining the object to which each of the pixel points belongs according to the edge information of each of the pixel points; and
the determining the belonging object relationship based on the object to which each of the pixel points belongs and the object to which the neighboring pixel point belongs comprises:
determining whether the neighboring pixel point and each of the pixel points belong to a same object or belong to different objects, according to the object to which the neighboring pixel point belongs and the object to which each of the pixel points belongs.

8. The method according to claim 4, wherein if the feature relationship comprises the confidence, and the image feature of at least part of pixel points comprises depth information;
the determining the feature relationship according to the image feature of each of the pixel points comprises:
determining depth information of each of the pixel points according to the depth information of the at least part of the pixel points; and
determining the confidence according to the depth information of each of the pixel points determined based on the depth information of the at least part of the pixel points, and the initial depth information of each of the pixel points determined based on the image feature of each of the pixel points.

9. The method according to claim 1, wherein the adjusting the parameter of the to-be-trained model according to the optimized depth information to obtain the image depth estimation model comprises:
determining loss information between the optimized depth information and preset reference depth information; and
adjusting the parameter of the to-be-trained model based on the loss information to obtain the image depth estimation model.

10. A method for processing image depth information, comprising:
acquiring an environmental image and environmental point cloud data; and
inputting the environmental image and the environmental point cloud data to the image depth estimation model generated by training based on the method according to claim 1, and outputting first optimized depth information of respective pixel points in the environmental image.

11. The method according to claim 10, after the acquiring an environmental image and environmental point cloud data, the method further comprises:
extracting edge information of the environmental image; and
the inputting the environmental image and the environmental point cloud data to the image depth estimation model, and outputting optimized depth information of respective pixel points in the environmental image comprises:
inputting the environmental image, the environmental point cloud data and the edge information to the image depth estimation model, and outputting the first optimized depth information of the respective pixel points in the environmental image.

12. An apparatus for training an image depth estimation model, comprising:
at least one processor; and
a memory communicatively connected to the at least one processor;
wherein the memory is stored with instructions executable by the at least one processor, and the instructions are executed by the at least one processor to enable the at least one processor to input a sample environmental image, sample environmental point cloud data and sample edge information of the sample environmental image into a to-be-trained model;
determine initial depth information of each of pixel points in the sample environmental image and a feature relationship between each of the pixel points and a corresponding neighboring pixel point of each of the pixel points according to the sample environmental image, the sample environmental point cloud data and the sample edge information of the sample environmental image through the to-be-trained model;
optimize the initial depth information of each of the pixel points according to the feature relationship to obtain optimized depth information of each of the pixel points; and adjust a parameter of the to-be-trained model according to the optimized depth information to obtain the image depth estimation model;
wherein the to-be-trained model is a neural network model, and the image depth estimation model is configured to obtain first optimized depth information of respective pixel points in an environmental image.

13. The apparatus according to claim 12, wherein the at least one processor is further configured to:
determine adjustment information according to the feature relationship; and
optimize the initial depth information of each of the pixel points according to the adjustment information to obtain the optimized depth information of each of the pixel points.

14. The apparatus according to claim 13, wherein the feature relationship comprises at least one of a similarity degree between each of the pixel points and the neighboring pixel point, a belonging object relationship between each of the pixel points and the neighboring pixel point, and a confidence of the initial depth information of each of the pixel points; and the at least one processor is configured to determine the adjustment information according to at least one of the similarity degree, the belonging object relationship, and the confidence.

15. The apparatus according to claim 14, wherein the at least one processor is further configured to:
   stitch to generate an image feature of each of the pixel points according to the sample environmental image, the sample edge information, and the sample environmental point cloud data; and
   determine, according to the image feature of each of the pixel points, the initial depth information and the feature relationship when each of the pixel points is taken as a center point of the sample environmental image.

16. The apparatus according to claim 15, wherein if the feature relationship comprises the confidence, and the image feature of at least part of pixel points comprises depth information; the at least one processor is configured to:
   determine depth information of each of the pixel points according to the depth information of the at least part of the pixel points; and
   determine the confidence according to the depth information of each of the pixel points determined based on the depth information of the at least part of the pixel points, and the initial depth information of each of the pixel points determined based on the image feature of each of the pixel points.

17. The apparatus according to claim 12, wherein the at least one processor is further configured to:
   determine loss information between the optimized depth information and preset reference depth information; and
   adjust the parameter of the to-be-trained model based on the loss information to obtain the image depth estimation model.

18. An apparatus for processing image depth information, comprising:
   at least one processor; and
   a memory communicatively connected to the at least one processor;
   wherein the memory is stored with instructions executable by the at least one processor, and the instructions are executed by the at least one processor to enable the at least one processor to acquire an environmental image and environmental point cloud data; and
   input the environmental image and the environmental point cloud data to an image depth estimation model generated by training based on the method according to claim 1, and output first optimized depth information of respective pixel points in the environmental image.

19. A non-transitory computer readable storage medium stored with computer instructions, wherein the computer instructions are configured to enable a computer to execute the method according to claim 1.

20. An automatic driving vehicle, comprising: a camera, a radar sensor, a controller, and the apparatus for processing image depth information according to claim 18; wherein,
   the camera is configured to acquire an environmental image of the automatic driving vehicle;
   the radar sensor is configured to collect environmental point cloud data of the automatic driving vehicle;
   the apparatus for processing image depth information is configured to output optimized depth information of respective pixel points in the environmental image according to the environmental image and the environmental point cloud data of the automatic driving vehicle; and
   the controller is configured to perform automatic driving control processing on the automatic driving vehicle according to the optimized depth information of the respective pixel points in the environmental image.

* * * * *